Oct. 22, 1963 R. S. ZEBARTH ETAL 3,107,391
PLATEN ASSEMBLY FOR DEBONING MACHINE
Filed Oct. 31, 1960 2 Sheets-Sheet 2
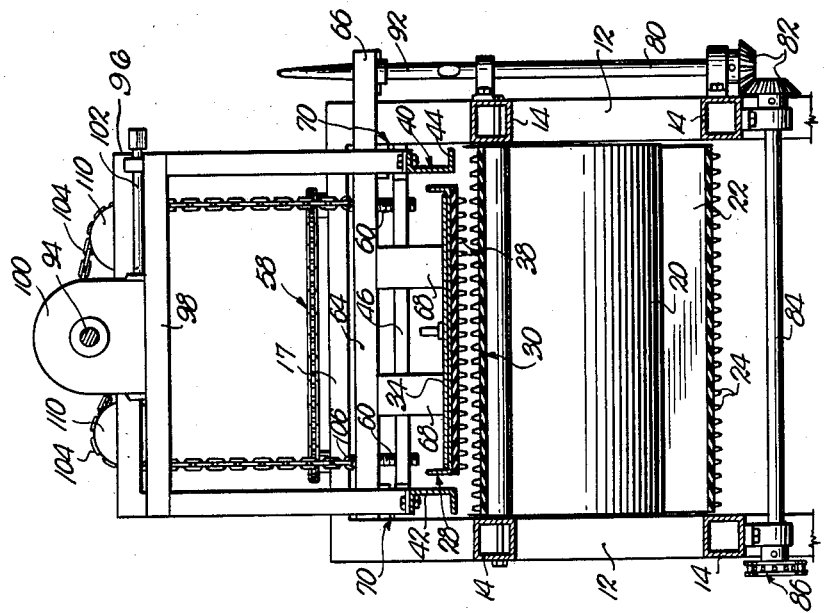
Fig. 4.
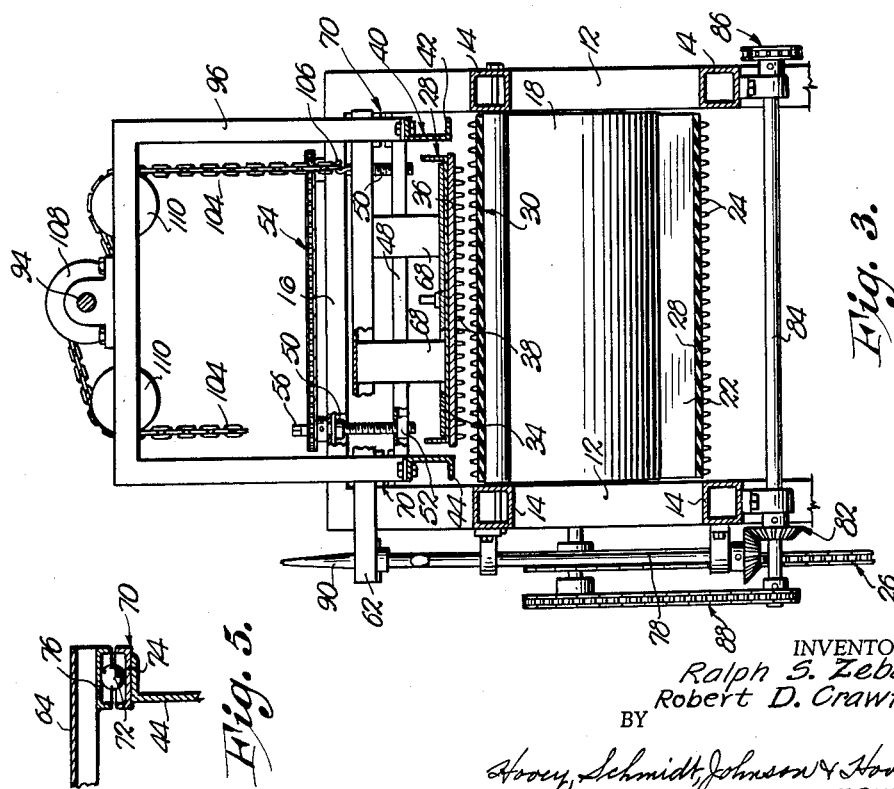
Fig. 3.
Fig. 5.
INVENTOR.
Ralph S. Zebarth
Robert D. Crawford
BY
Hovey, Schmidt, Johnson & Hovey
ATTORNEYS.

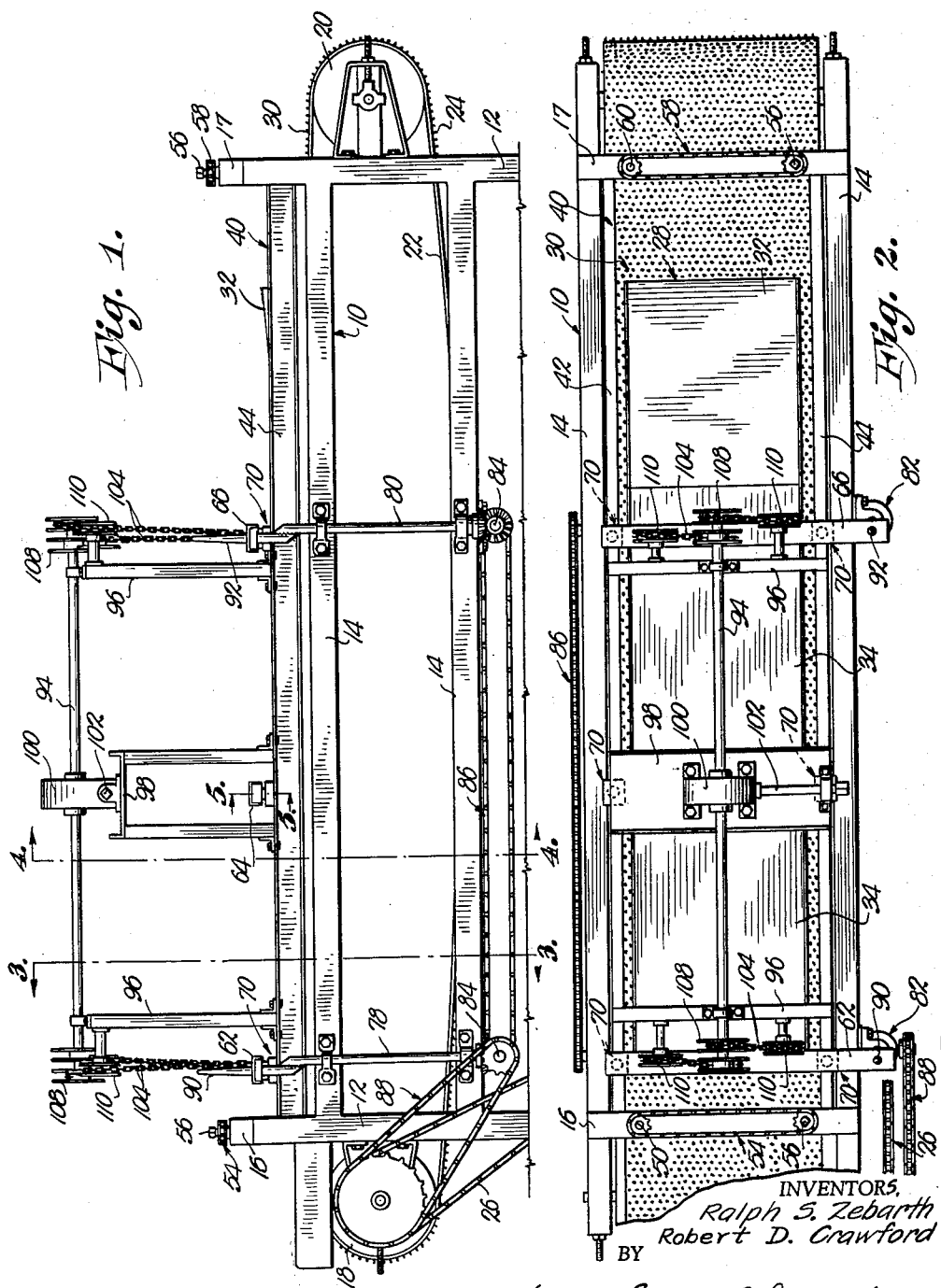

United States Patent Office 3,107,391
Patented Oct. 22, 1963

3,107,391
PLATEN ASSEMBLY FOR DEBONING MACHINE
Ralph S. Zebarth, Kansas City, and Robert D. Crawford, Parkville, Mo., assignors to Gordon Johnson Company, Kansas City, Mo., a corporation of Missouri
Filed Oct. 31, 1960, Ser. No. 66,252
3 Claims. (Cl. 17—1)

This invention has to do with machines for removing meat from bones, as, for example, poultry parts, and operable on the principle of imparting a rubbing action through use of opposed elements having flexible fingers or protuberances which act upon the meat as the elements are caused to move relatively.

In the machine containing the improvements of the instant invention the product to be treated is advanced through use of an endless belt. An elongated platen overlies the uppermost stretch of the belt and is provided with depending protuberances that cooperate with similar finger means on the belt itself to remove the meat from the bones as the product is continually advanced. An oscillatory movement is imparted to the platen so that both the belt movement and the platen movement effects a shredding of the meat and a loosening of such edible parts from the bones to be subsequently separated and disposed of in any suitable manner.

The improvements of the instant invention relate to the platen assembly and its relationship to the remaining parts of the machine including the aforementioned belt or continuously moving band.

It is the most important object of the present invention, therefore, to provide a platen assembly that is fully effective for the purposes desired yet inexpensive, easily cleaned and freely movable in an oscillating manner with little opportunity of getting out of order through continuous use without need of substantial operator attention.

In the drawings:

FIGURE 1 is a fragmentary side elevational view of a platen assembly for deboning machines made pursuant to our present invention;

FIG. 2 is a fragmentary top plan view thereof;

FIG. 3 is an enlarged fragmentary vertical cross-sectional view taken on line 3—3 of FIG. 1;

FIG. 4 is a fragmentary, enlarged cross-sectional view taken on line 4—4 of FIG. 1; and FIG. 5 is an enlarged, fragmentary detailed cross-sectional view taken on line 5—5 of FIG. 1.

The deboning machine illustrated in the drawings is provided with suitable support means broadly designated by the numeral 10 that include a plurality of legs 12 interconnected by longitudinal beams 14, by cross members 16 and 17, and by other suitable bracing (not shown) as may be needed or desired. The legs 12 support a pair of horizontally spaced drums 18 and 20 around which is trained a continuous band or belt 22 of flexible material such as rubber, the band 22 being in turn provided with outwardly projecting integral fingers or protuberances 24 throughout its outermost surface. During operation the band 22 is driven continuously by means of a drive chain 26 operably coupled with the drum 18 to rotate the latter anticlockwise, viewing FIG. 1.

In accordance with the improvements of the instant invention an elongated platen broadly designated by the numeral 28 overlies the uppermost horizontal stretch 30 of the band 22 in substantial parallelism therewith, it being noted in FIG. 2 that the platen 28 is substantially coextensive in length with the stretch 30 and is of essentially the same width as stretch 30. A leading section 32 of the platen 28 is inclined slightly upwardly away from the stretch 30, as best seen in FIG. 1, to present an entrance mouth for the products to be treated and carried by the stretch 30 beneath the platen 28.

Platen 28 is transversely U-shaped as seen in FIGS. 3 and 4 and supports a plurality of weights 34 to hold it against upward movement by the material passing between stretch 30 and platen 28. A liner 36 made in a manner similar to the band 22 is attached to the lower face of the platen 28 and has a plurality of fingers or protuberances 38 integral therewith and depending from its entire lower surface, as is clear in FIGS. 3 and 4.

Means supporting the platen 28 for oscillatory movement includes a frame broadly designated by the numeral 40, frame 40 including a pair of parallel longitudinal elements 42 and 44 joined at their ends by cross bars 46 and 48 spaced directly below cross members 17 and 16, respectively. The cross bar 48 is suspended from the cross member 16 by a pair of bolts 50 rotatably attached to the cross member 16 and provided with nuts, one of which is shown in FIG. 3 and designated by the numeral 52. The nut 52 is rigid to the cross bar 48; accordingly, rotation of the bolts 50 raises and lowers the cross bar 48. Chain and sprocket means 54 interconnect the bolts 50 so that the same are rotated simultaneously when one of the bolts 50 is rotated by application of a suitable tool to squared uppermost end 56 thereof.

An identical arrangement is provided between the cross member 17 and the cross bar 46 including chain and sprocket means 58 operably coupled with bolts 60. Consequently, the height of the entire frame 40 may be adjusted by actuation of the two chains 54 and 58.

The platen 28 is substantially confined within the frame 40 and carried thereby through the medium of a plurality of cross elements 62, 64 and 66 which are in the nature of transverse members overlying the longitudinal members 42 and 44 of frame 40. The elements 62, 64 and 66 become parts of the platen 28 by virtue of the fact that the latter is suspended from such elements through use of a plurality of straps 68 which may be welded or otherwise affixed both to the upper surface of the platen 28 and the lower surfaces of the elements 62, 64 and 66.

Cage means (see FIG. 5) broadly designated by the numeral 70 is provided between element 64 and longitudinal member 44 to confine a ball 72, it being noted that the cage means 70 consists of a pair of oppositely facing cups 74 and 76 rigidly secured to members 44 and 64, respectively. An identical cage 70 and ball 72 is provided between members 42 and 64 and the two members 62 and 66 are supported by the longitudinal members 42 and 44 of frame 40 in the same manner.

Such floating support of the platen 28 by the frame 40 permits limited oscillatory movement of the platen 28 and such is accomplished by rotation of a pair of shafts 78 and 80 for the elements 62 and 66, respectively. The vertical shafts 78 and 80 are rotatably carried by one pair of superimposed beams 14 of the support means 10 and are driven by intermeshing bevel gears 82 that are in turn driven by cross shafts 84 operably interconnected by chain and sprocket means 86. Power is derived from the driven drum 18 through the medium of chain and sprocket means 88 coupled with one of the shafts 84.

Tapered pins 90 and 92 are rigidly secured to the shafts 78 and 80, respectively, at their uppermost ends in eccentric relationship to the axes of rotation of the shafts 78 and 80. The elements 62 and 66 extend outwardly at one end thereof beyond the longitudinal member 44 (see FIGS. 3 and 4) and are provided with openings for receiving the corresponding pins 90 and 92, all to the end that as the shafts 78 and 80 are rotated, oscillatory movement is imparted to the elements 62 and 66 and therefore the platen 28 suspended therefrom by straps 68. The weights 34 assist in holding such unit in position where the same is at all times supported by the frame 40 through all of the balls 72, which balls 72 are free to roll within their respective cages 70 during the oscillation of the platen 28. Such operation is the same throughout all adjusted positions of the frame 40 beneath the cross members 16 and 17 to vary the distance between the platen 28 and the stretch 30 of the flexible band 22.

The frame 40 also supports a shaft 94 through the medium of a pair of U-shaped standards 96 secured to the longitudinal members 42 and 44 and elevated platform 98 carried by the members 42 and 44 beneath the shaft 94 supports a gear box 100 having gear means therewithin (not shown) operably coupled with the shaft 94. A suitable tool may be applied to a stub shaft 102 projecting from the box 100 to effect rotation of the shaft 94.

A pair of chains 104 are attached to each of the elements 62 and 66 by hooks 106 and each chain 104 is in turn attached to a windlass 108 secured to the shaft 94 after passing over an idler pulley 110 carried by the corresponding standard 96.

It follows, therefore, that upon rotation of the stub shaft 102 in one direction to actuate the shaft 94 the chains 104 will be wound on their corresponding windlasses 108 to raise the cross elements 62 and 66, thereby lifting all of the transverse members 62, 64 and 66 off the balls 72. This raises the platen 28 through the straps 68 to a position well above the frame 40, permitting inspection, cleaning, repair and the like of the platen 28 and most particularly permitting cleaning of the protuberances 38 on the liner 36 of the platen 28. When the elements 68 and 66 are thus raised they slide easily along the tapered pins 90 and 92 even to a point of spaced relationship thereabove if desired.

As above intimated, one of the most important uses of the machine is in connection with loosening meat from poultry parts. Such parts are ordinarily cooked, thereby tenderizing the meat and facilitating removal from the bone. The cooked product is then fed to the upper stretch 30 of the belt 22 and carried thereby beneath the platen 28. Continuous advancement of the material by the belt 22, coupled with continuous oscillation of the platen 28 operates to shred the meat from the bone. Consequently, any suitable apparatus may be provided adjacent the drum 18 for receiving the meat and bone and dividing the same into two batches consisting of the edible meat portion and the waste in the form of the bones themselves.

Having thus described the invention what is claimed as new and desired to be secured by Letters Patent is:

1. In a machine for removing meat from bones:
   a support;
   a continuous movable belt carried by the support and having a substantially horizontal upper flight;
   a frame above the belt;
   a horizontal platen between said frame and said flight, the platen and the belt being provided with protuberances for removing meat when the meat and bones pass between the platen and said flight;
   a platen supporting unit above the frame;
   means suspending the platen from said unit;
   anti-friction means between the frame and said unit for supporting the latter and including a plurality of cages each housing an anti-friction ball, each cage having a downwardly facing cup on the unit and an upwardly facing cup on the frame;
   means suspending said frame from the support for vertical movement of the frame to vary the distance between the platen and flight; and
   means on the support and coupled with said unit for shifting the latter on the balls to augment the meat removing action of the protuberances during movement of the belt.

2. The invention of claim 1, wherein the unit shifting means includes a vertical shaft having a pin secured to its uppermost end and eccentric thereto, said unit having an opening receiving the pin whereby the latter is oscillated upon rotation of the shaft.

3. The invention of claim 2, wherein said pin is tapered whereby to maintain an operative connection between the pin and the unit in all vertically adjusted positions of the frame.

References Cited in the file of this patent

UNITED STATES PATENTS

| 925,235 | Scott et al. | June 15, 1909 |
| 2,605,797 | Green | Aug. 5, 1952 |
| 2,932,058 | Childers | Apr. 12, 1960 |
| 2,964,080 | Gardner | Dec. 13, 1960 |

FOREIGN PATENTS

| 564,162 | Germany | Nov. 14, 1932 |